United States Patent [19]
Highlen

[11] Patent Number: 5,570,910
[45] Date of Patent: Nov. 5, 1996

[54] COUPLING ASSEMBLY

[75] Inventor: John L. Highlen, Rives Junction, Mich.

[73] Assignee: Aeroquip Corporation, Maumee, Ohio

[21] Appl. No.: 516,954

[22] Filed: Aug. 18, 1995

[51] Int. Cl.$^6$ .................................................. F16L 37/088
[52] U.S. Cl. .......................................... 285/308; 285/321
[58] Field of Search ............................... 285/39, 308, 321

[56] References Cited

U.S. PATENT DOCUMENTS

| | | | |
|---|---|---|---|
| 2,479,960 | 8/1949 | Osborn | 285/308 |
| 2,848,255 | 8/1958 | Klein et al. | 285/321 X |
| 3,177,018 | 4/1965 | Goodwin | 285/321 X |
| 3,398,977 | 8/1968 | Yoneda | 285/321 |
| 3,773,360 | 11/1973 | Timbers | 285/321 |
| 3,887,222 | 6/1975 | Hammond | 285/321 |
| 4,105,226 | 8/1978 | Frey et al. | 285/321 |
| 4,240,654 | 12/1980 | Gladieux | 285/321 X |
| 4,872,710 | 10/1989 | Konecny et al. | 285/321 X |
| 5,022,687 | 6/1991 | Ariga | 285/321 |
| 5,042,848 | 8/1991 | Shiozaki | 285/277 |
| 5,076,541 | 7/1993 | Daghe et al. | 251/309 |
| 5,226,682 | 7/1993 | Marrison et al. | 285/308 |
| 5,301,408 | 4/1994 | Berman et al. | 285/39 X |

FOREIGN PATENT DOCUMENTS

| | | | |
|---|---|---|---|
| 373920 | 6/1990 | European Pat. Off. | 285/308 |
| 659848 | 1/1964 | Italy | 285/321 |

OTHER PUBLICATIONS

Aeroquip Aerospace Engineering Bulletin, No. AEB 65, Aeroquip Corporation, 1964.
Aeroquip Aerospace Engineering Bullentin, No. AFB 40, Aeroquip Corporation, 1970.

*Primary Examiner*—Dave W. Arola
*Attorney, Agent, or Firm*—Emch, Schaffer, Schaub & Porcello Co., L.P.A.

[57] ABSTRACT

A coupling assembly for connecting two members that includes a split locking ring having a first end and a second end. The first and second ends are aligned to permit abutting engagement. The assembly further includes a first member extending along an axis from a forward end toward a rearward portion. The first member has an exterior surface. A rib extends outwardly from the exterior surface of the first member. The rib includes a ramp tapering in a direction away from the forward end and away from the axis. The rib further includes a cylindrical surface substantially parallel to the axis extending rearwardly from the ramp. The rib further includes a shoulder tapering away from the forward end and inwardly toward the axis. The assembly also includes a second member having a leading end and a leading portion extending therefrom for receiving the first member. The leading portion has an inner surface. A locking ring receiving groove is defined by the inner surface of the second member. A locking ring retaining groove is also defined by the inner surface of the second member.

19 Claims, 5 Drawing Sheets

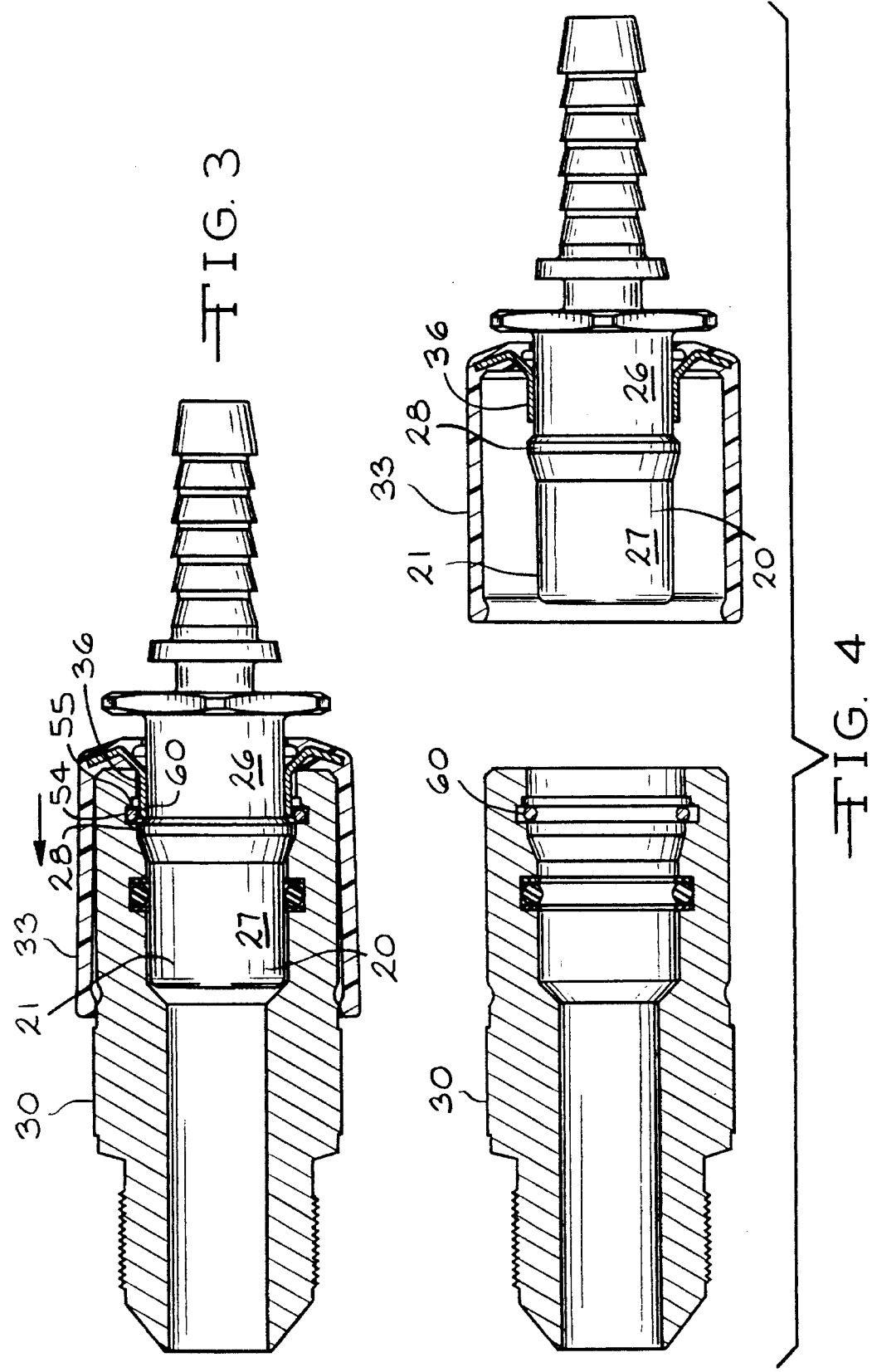

COUPLING ASSEMBLY

BACKGROUND OF THE INVENTION

The present invention is directed to a coupling assembly for connecting two members. More specifically, the invention is directed to a coupling assembly that includes, among other things, a locking ring retaining groove defined by one of the members that retains a locking ring that maintains secure connection of the two members.

Fitting and coupling assemblies that include locking rings are known in the art. For example, U.S. Pat. No. 5,226,682 discloses various embodiments of a coupling assembly for connecting two members that includes an annular locking ring. The prior art coupling assemblies include a chamfer or angled portion adjacent a groove that receives the locking ring during connection of the two members. The prior art assemblies are adequate for use in, for example, automotive-related components where pressure acting on the members is relatively low. It has been found that the prior art coupling assemblies do not meet the requirements for high-pressure applications that are encountered, for example, in aerospace applications. Therefore, there is a need for a coupling assembly for use in high-pressure applications. The present invention satisfies this need.

SUMMARY OF THE INVENTION

The present invention is directed to a coupling assembly for connecting two members that includes a split locking ring having a first end and a second end. The first and second ends are aligned to permit abutting engagement. The assembly further includes a first member extending along an axis from a forward end toward a rearward portion. The first member has an exterior surface. A rib extends outwardly from the exterior surface of the first member. The rib includes a ramp tapering in a direction away from the forward end and away from the axis, The rib further includes a cylindrical surface substantially parallel to the axis extending rearwardly from the ramp. The rib further includes a shoulder tapering away from the forward end and inwardly toward the axis. The assembly also includes a second member having a leading end and a leading portion extending therefrom for receiving the first member. The leading portion has an inner surface. A locking ring receiving groove is defined by the inner surface of the second member. A locking ring retaining groove is also defined by the inner surface of the second member.

The first member is coupled to the second member upon insertion of the first member into the second member, The split locking ring travels up the ramp into the locking ring receiving groove. The ring then travels over the cylindrical surface and contracts to engage the shoulder and the locking ring retaining groove. The engagement of the ring with the shoulder and the locking ring retaining groove maintains a strong connection between the first and second members even under high-pressure situations.

It is a primary object of the present invention to provide a coupling assembly having a locking ring retaining groove that engages a locking ring to provide a superior coupling assembly, It is an important object of the present invention to provide a coupling assembly having a release sleeve to disengage the locking ring.

Other objects and advantages of the present application will become apparent upon a review of the following detailed description of the preferred embodiment and the accompanying drawings.

BRIEF DESCRIPTION OF THE DRAWINGS

FIG. 3 is a side view of the present invention showing the locking ring being moved by the release sleeve;

FIG. 4 is a view similar to the view of FIG. 3 showing the first member separated from the second member;

DETAILED DESCRIPTION OF THE PREFERRED EMBODIMENT

Figures 1, 1A:
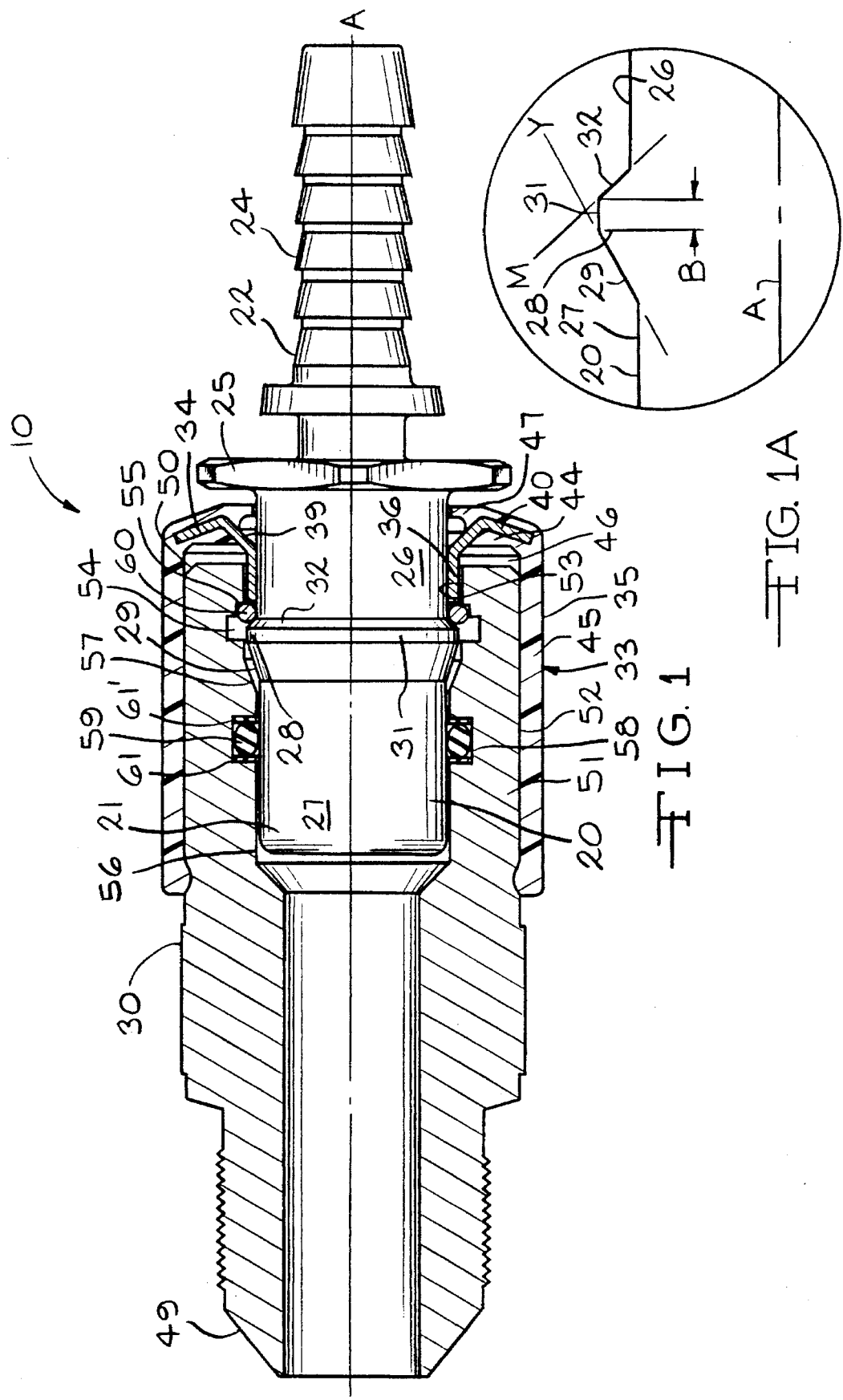
FIG. 1 is a side elevational view of the coupling assembly of the present invention.
FIG. 1A is a detailed view of the rib of the present invention.

The coupling assembly of the present invention will now be described with reference being made to the drawings. The coupling assembly of the present invention is designated by the reference number 10. Referring to Figs. I and 2, the coupling assembly 10 includes a first male member 20 and a second female member 30. The male member 20 and the female member 30 each extend along an axis A when the assembly is in the coupled position as shown in FIG. 1. The male and female members 20 and 30 can be formed of metal, such as steel. The male member 20 extends from a forward end 21 intended for insertion in the female member 30 to a rearward portion 22 and has a passageway 23 extending therethrough. If desired, the rearward portion 22 may be provided with a hose nipple 24 for receiving a hose (not shown) and a series of flats 25 defining a hexagonal cross section for engagement by a wrench.

As shown in FIG. 1 and 1A, the male member 20 has a trailing cylindrical exterior surface 26 and a leading exterior surface 27 that are separated by a rib 28. The rib 28 includes a tapered ramp 29 extending rearwardly and outwardly from the leading exterior surface 27 at an angle Y relative to the axis A in the range of from about 10° to about 25° and preferably at an angle of about 18°. The ramp 29 extends to a cylindrical surface 31 that is parallel to the axis A and extends rearwardly from the ramp 29 a distance B of at least 0.010 inch and, preferably at least 0.030 inch. The final portion of the rib is a shoulder 32 that tapers rearwardly and inwardly from the cylindrical surface 31 to meet the trailing cylindrical exterior surface 26. The shoulder 32 should taper at an angle M in the range of from about 35° to about 55° relative to the axis A and preferably at an angle of about 45°.

Figure 5:
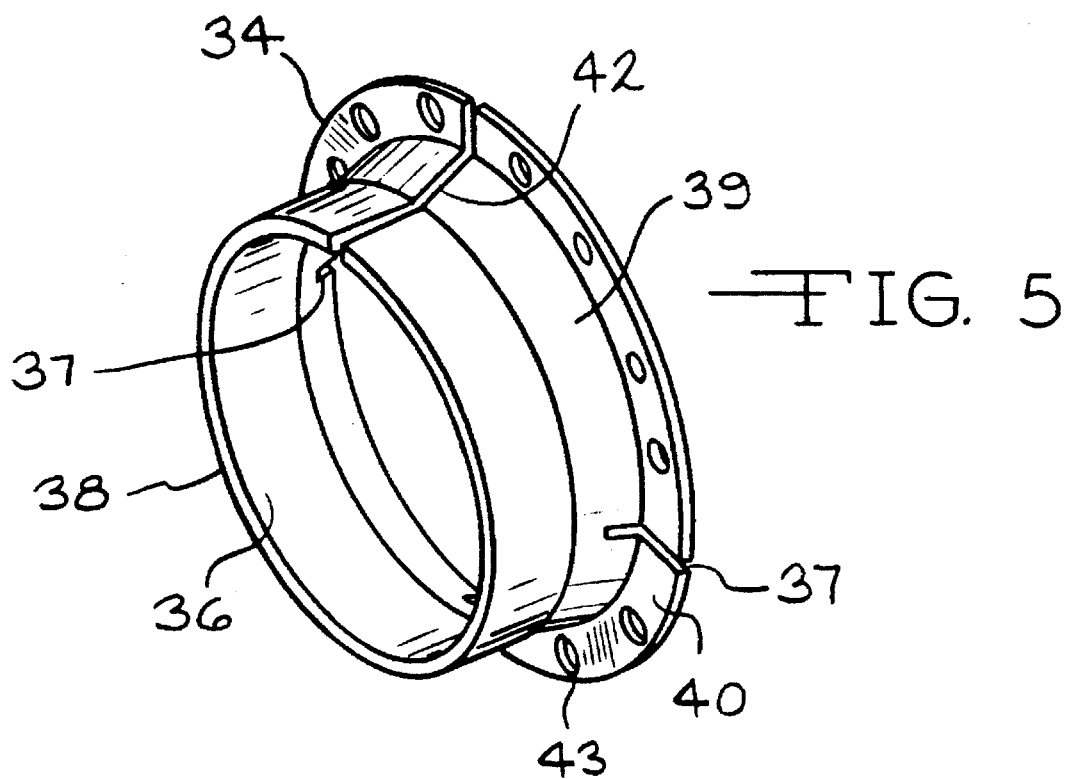
FIG. 5 is a perspective view of the metal portion of the release sleeve.

Still referring to FIG. 1, the other component of the male member 20 is a separately formed release sleeve 33 consisting of a metal portion 34 and a thermoplastic and/or elastomeric (TPE) portion 35. As shown in FIG. 5, the metal portion 34 includes a split cylindrical wall 36 having a plurality of slots 37. The split cylindrical wall 36 extends from a leading edge 38 to tapered wall portion 39. The slots 37 can extend into the tapered wall portion 39. A radially outwardly extending flange 40 extends from the tapered wall portion 39. A single slot or split 42 extends completely through the metal portion 34 from the leading edge 38 through the cylindrical wall 36 to the tapered wall portion 39 and flange 40. The presence of the slot 42 permits the cylindrical wall 36 to expand as the release sleeve 33 is moved to a forward release position up the shoulder 32 and onto the cylindrical surface 31. The presence of the slots 37 prevents a build up of stress in the flange 40 and the tapered wall portion 39 as the cylindrical wall 36 expands. The flange 40 has a plurality of apertures 43.

As shown in FIG. 1, the TPE portion 35 can be molded around the flange 40 and includes a flange portion 44 and a cylindrical wall portion 45 spaced from and substantially parallel to the split cylindrical wall 36. During molding of the TPE portion 35 around the flange 40, plastic and/or elastomeric material will flow into the apertures 43 to provide for secure attachment to the metal portion 34. As shown in FIG. 1, the split cylindrical wall 36 and the cylindrical wall portion 45 cooperate to define a gap 46. The TPE portion 35 includes a sealing fin 47 extending radially inwardly from the flange portion 44 and inwardly from the tapered wall portion 39. The sealing fin 47 extends inwardly to engage the trailing cylindrical exterior surface 26 of the male member 20 to act as a dust seal. The seal prevents dust from entering the engaged coupling between the release sleeve 33 and the trailing exterior surface 26.

Figure 2:
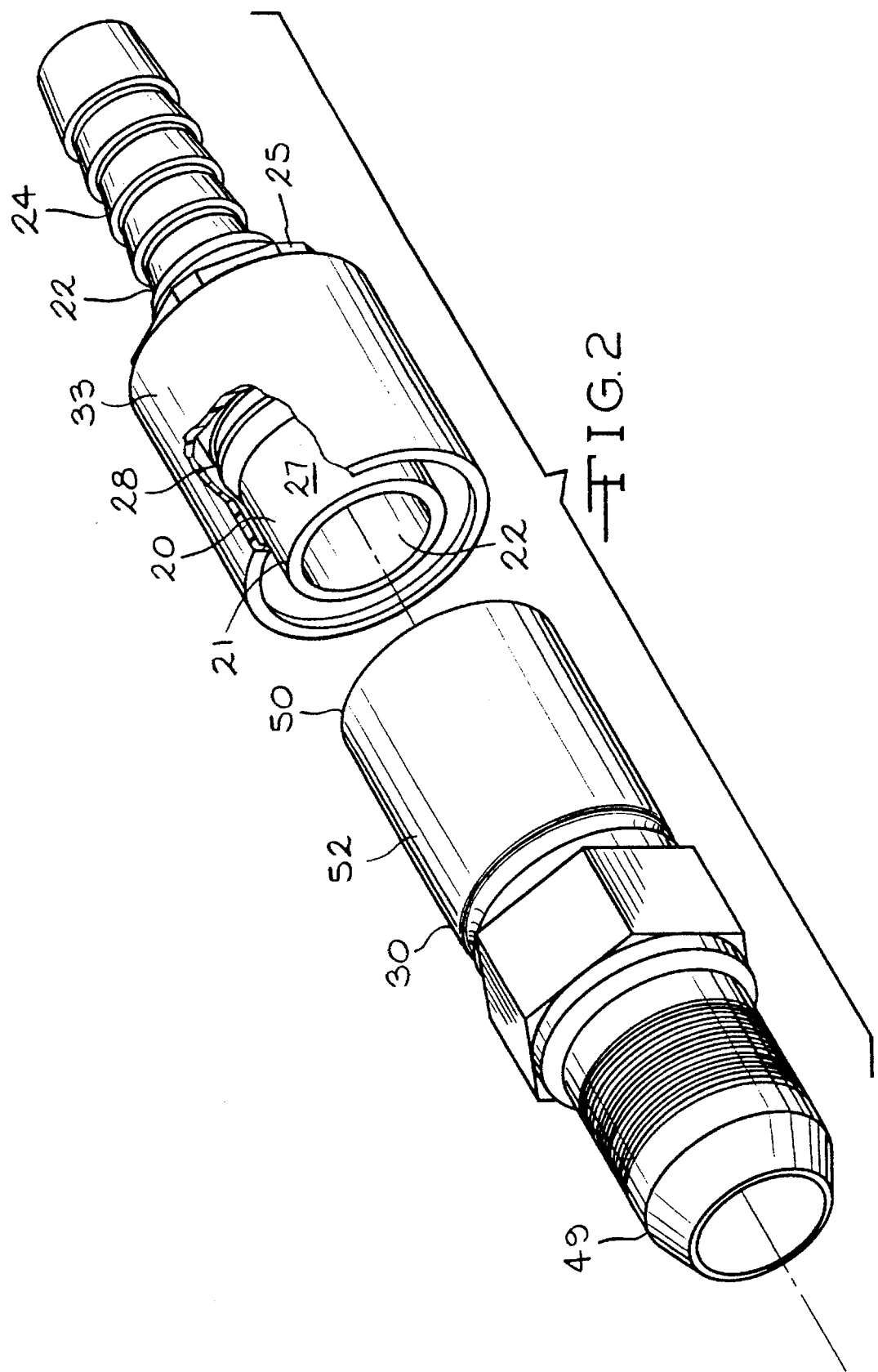
FIG. 2 is a perspective view of the coupling assembly with a portion of the release sleeve cut-away.

As shown in FIGS. 1 and 2, the second female member 30 extends from a remote end 49 to a leading end 50. The remote end 49 can include external threads (as shown) or other suitable connection means for fastening to a separate connection (not shown). The female member 30 includes a leading portion 51 adjacent the leading end 50. The leading portion 51 includes an exterior cylindrical surface 52 having a size to be received in the cylindrical wall portion 45 of the release sleeve 33 and a first interior cylindrical surface 53 sized to receive the split cylindrical wall portion 36 of the metal portion 34 of the release sleeve 33.

Figure 7:
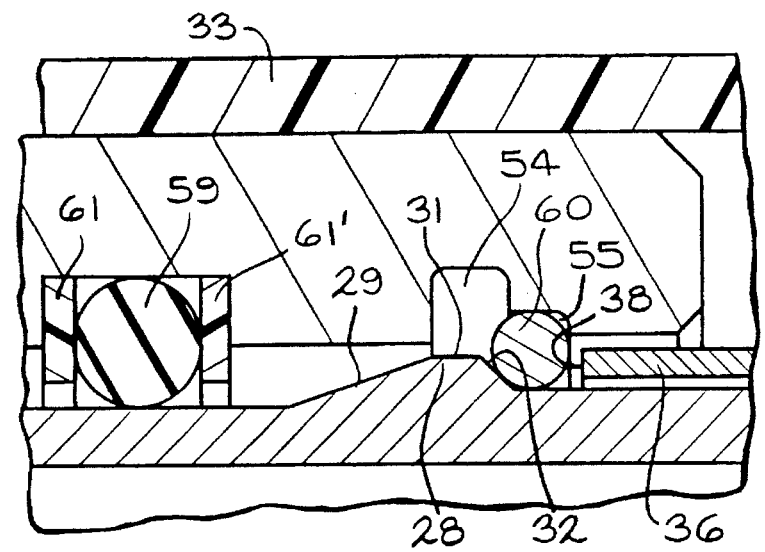
FIG. 7 is a detailed view of the locking ring engaged with the rib and locking ring retaining groove of the present invention.

Referring to FIGS. 1 and 7, an inwardly facing annular locking ring receiving groove 54 extends outwardly from the interior cylindrical surface 53 of the female member 30. The groove 54 is sized to receive therein a split metal locking ring 60. A shallow locking ring retaining groove 55 extends outwardly from the first interior cylindrical surface 53 adjacent the locking ring receiving groove 54. The locking ring retaining groove 55 is sized to snugly engage the locking ring 60. It is important that there is not enough clearance in the groove 55 to allow the locking ring 60 to be released from the groove into the locking ring receiving groove 54 when the male member 20 is coupled to the female member 30 as shown in FIG. 1.

Referring to FIG. 1, a second interior cylindrical surface 56 of smaller size than the first cylindrical surface 53 is positioned toward the remote end 49 from the locking ring receiving groove 54 and is joined thereto by an inwardly tapering wall portion 57. The second interior cylindrical surface 56 is sized to receive the leading exterior surface 27 of the male member 20. The second interior cylindrical wall surface 56 has formed therein an inwardly facing annular groove 58 in which is positioned an annular seal 59 of neoprene or other suitable sealing material and at least one rigid plastic ring 61. In the present embodiment, there are two plastic rings 61 and 61'. The plastic rings 61 and 61' have apertures sized to snugly receive the leading exterior surface 27 of the male member 20. The annular seal 59 is sized to sealingly receive and engage the leading exterior surface 27. The presence of the rigid plastic rings 61 and 61' in positions to be engaged by the forward end 21 of the male member 20 serves to protect the annular seal 59 from cutting or other damage upon insertion of the leading exterior surface 27 therethrough. The rigid plastic rings 61 and 61' also serve to protect the annular seal 59 from damage when the coupling assembly 10 is used in systems having high-pressure fluid.

Figure 6:
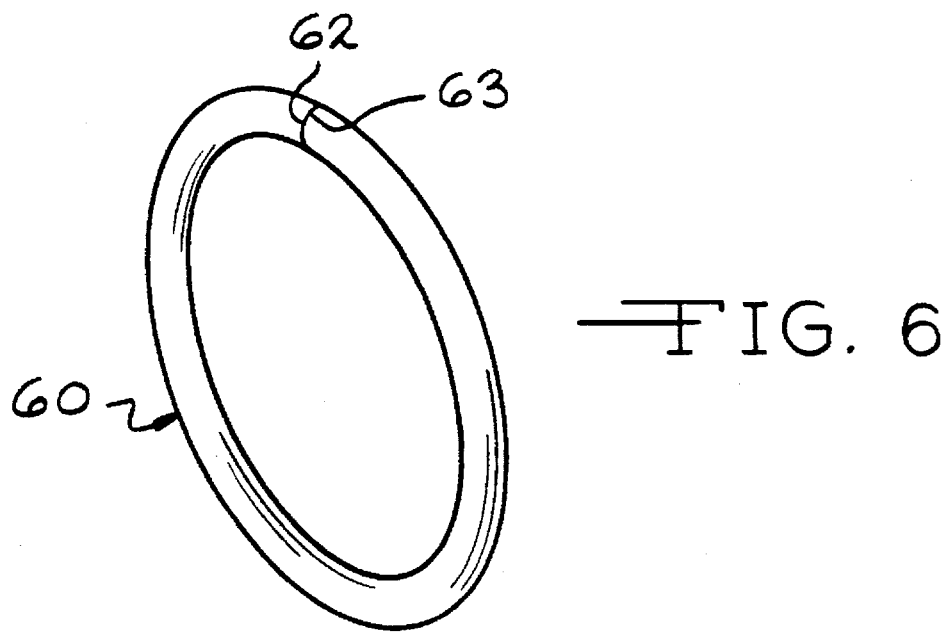
FIG. 6 is a perspective view of the split locking ring.

As shown in FIGS. 1 and 6, the coupling assembly 10 of the present invention includes a split metal locking ring 60. The locking ring 60 is positioned in the locking ring receiving groove 54. The locking ring 60 is formed of a spring tempered phosphoric bronze material or, preferably, a spring tempered stainless steel. As shown in FIG. 6, the locking ring 60 includes a first end 62 and a second end 63. The first and second ends 62 and 63 should either be in abutting relationship or have a maximum gap of 0.030 inch when the male member 20 is disconnected from the female member 30. The locking ring 60 has an external diameter smaller than the diameter defined by the outermost portion of the groove 54 but larger than the diameter of the first interior cylindrical surface 53 when the members are disconnected. The locking ring 60 has an internal diameter substantially equal to or, preferably, slightly smaller than that of the trailing cylindrical surface 26 of the male member 20 to snugly engage the trailing cylindrical surface when the male member 20 is connected to the female member 30. The internal diameter of the locking ring 60 is smaller than the diameter of the cylindrical surface 31 of the rib 28. Therefore, the locking ring 60 will be retained in the groove 54 when the male member 20 is disconnected from the female member 30. However, by virtue of the locking ring 60 being split, the diametrical size of the locking ring can be expanded and the end portions 62 and 63 become separated as the locking ring 60 moves over the ramp 29 and cylindrical surface 31 of the rib 28 upon insertion of the male member 20 into the female member 30.

Referring now to FIGS. 3, 4, 7, 8 and 9, upon insertion of the male member 20 into the female member 30, the forward end 21 and the leading exterior surface 27 will pass through the split locking ring 60 until the ramp 29 reaches the locking ring 60. Continued inward movement of the male member 20 will cause the ramp 29 to expand the locking ring 60 thereby opening the gap between the ends 62 and 63 by increasing amounts as the locking ring 60 moves up to the maximum diameter of the ramp 29 and onto the cylindrical surface 31. As the cylindrical surface 31 moves past the locking ring 60 upon continued forward movement of the male member 20, the locking ring 60 by virtue of the resilience of the metal will contract to a size approaching its original size. The contracted locking ring 60 will engage the shoulder 32 of the rib 28 and the locking ring retaining groove 55. This engagement will prevent the withdrawal of the male member 20 from the female member 30. It has been found that the locking ring retaining groove 55 prevents the disengagement of the locking ring 60 even under high fluid pressure in the coupling. The locking ring receiving groove 55 traps the locking ring between the groove 55 and the shoulder 32 of the rib 28 to create a positive lock between the male and female members, 20 and 30.

As shown in FIG. 1, when the male member 20 is fully connected to the female member 30, the leading exterior surface 27 is sealingly engaged to the annular seal 59 thereby preventing fluid leakage. Further, the leading portion 51 of the female member is positioned in the gap 46 between the cylindrical wall portion 45 of the TPE portion 35 and the split cylindrical wall 36 of the metal portion 34. The exterior cylindrical surface 52 is in contact with an end of the cylindrical wall portion 45 to prevent dust or other contaminants from entering the area around the locking ring 60 when the members are connected together.

Figure 8:
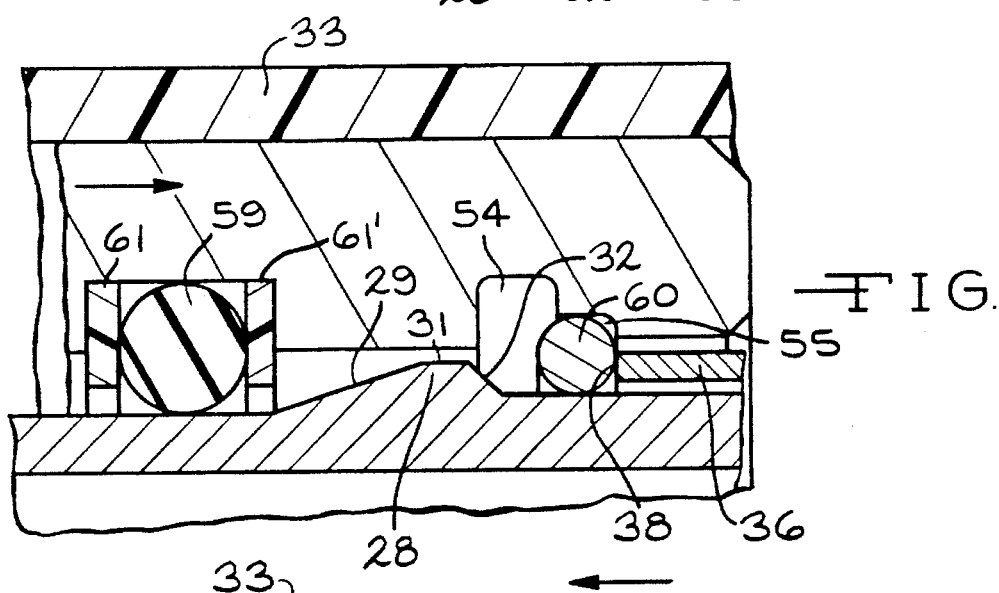
FIG. 8 is a view similar to the view of FIG. 7 showing the release sleeve engaging the locking ring.
Figure 9:
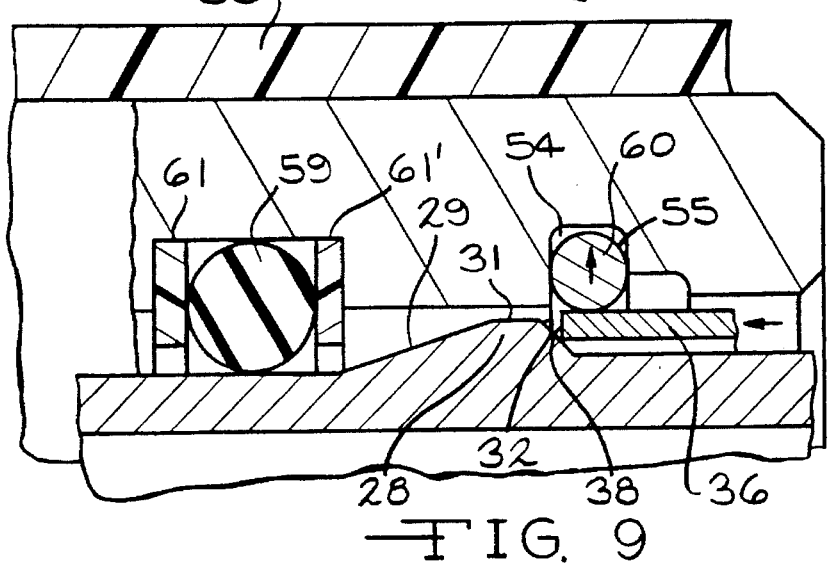
FIG. 9 is a view similar to the view of FIG. 7 showing the release sleeve moving the locking ring into the locking ring receiving groove to uncouple the first and second members.

As shown in FIG. 1, when the male member 20 is connected to the female member 30, there is a space between the leading end 50 and the interior of the flange portion 44. Further, the leading edge 38 of the cylindrical wall 36 of the release sleeve 33 is slightly spaced from the locking ring 60. As shown in FIGS. 7 through 9, when it is desired to disconnect the male member 20 from the female member 30, the female member is moved relative to the male member in the direction of the arrow shown in FIG. 8. This causes the locking ring 60 to be disengaged from the shoulder 32 of the rib 28. When the members are in the positions shown in FIG. 8, the release sleeve 33 can be moved in the direction of the arrow shown in FIG. 9. The movement of the release sleeve 33 will cause the cylindrical wall 36 and leading edge 38 to move in the direction indicated by the arrow in FIG. 9. The leading edge 38 will engage the locking ring 60 to urge it out of the locking ring retaining groove 55. The cylindrical wall 36 will then engage the internal diameter of the locking ring 60 to urge the locking ring into the locking ring receiving groove 54 in the direction indicated by the arrow in FIG. 9. When the locking ring 60 is positioned in the locking ring receiving groove 54, the locking ring will no longer interfere with the rib 28. This will allow the male member 20 to be disconnected from the female member 30.

It should be understood that many changes can be made to the invention as described above and still fall within the scope of the following claims.

I claim:

1. A coupling assembly for connecting two members comprising:

a split locking ring having a first end and a second end, said first and second ends being aligned to permit abutting engagement;

a first member extending along an axis from a forward end toward a rearward portion and having an exterior surface;

a rib extending outwardly from said exterior surface of said first member, said rib including a ramp tapering in a direction away from said forward end and away from said axis, said rib further including a cylindrical surface substantially parallel to said axis extending rearwardly from said ramp, said rib further including a shoulder tapering away from said forward end and inwardly toward said axis;

a second member having a leading end and a leading portion extending therefrom for receiving said first member, said leading portion having an inner surface;

a locking ring receiving groove defined by said inner surface of said second member; and a locking ring retaining groove defined by said inner surface of said second member, said retaining groove adjoining said receiving groove;

whereby upon insertion of said first member into said second member, said split locking ring travels up said ramp into said locking ring receiving groove, over said cylindrical surface and contracts to engage said shoulder and said locking ring retaining groove.

2. The coupling assembly of claim 1, wherein said first and second ends of said split locking ring define a gap not to exceed 0.030 inch.

3. The coupling assembly of claim 1, wherein said split locking ring is formed of spring tempered stainless steel.

4. The coupling assembly of claim 1, wherein said ramp of said rib tapers away from said axis of said first member at an angle in the range of from about 10° to about 25° relative to said axis.

5. The coupling assembly of claim 4, wherein said ramp tapers at an angle in the range of from about 16° to about 20° relative to said axis.

6. The coupling assembly of claim 1, wherein said cylindrical surface of said rib extends rearwardly from said ramp a distance of at least 0.010 inch.

7. The coupling assembly of claim 1, wherein said cylindrical surface of said rib extends rearwardly from said ramp a distance of at least 0.030 inch.

8. The coupling assembly of claim 1, wherein said shoulder tapers at an angle in the range of from about 35° to about 55° relative to said axis.

9. The coupling assembly of claim 1, wherein said locking ring retaining groove substantially conforms to the size of said split locking ring.

10. The coupling assembly of claim 1, wherein said second member includes an annular recess extending outwardly from said inner surface and a resilient annular seal received in said annular recess, a portion of said annular seal extending inwardly of said inner surface and wherein said first member has a sealing portion between said forward end and said ramp, said sealing portion sized to sealingly engage said annular seal upon engagement of said first member in said second member.

11. The coupling assembly of claim 10, wherein at least one rigid annular ring is positioned in said annular recess axially between said annular seal and said locking ring receiving groove, a portion of said annular ring being inwardly of said inner surface.

12. The coupling assembly of claim 1, wherein said assembly further includes a release sleeve movably mounted adjacent said exterior surface of said first member for movement from a rearward position to a forward position, said sleeve having a leading edge facing toward said shoulder and a split cylindrical wall extending from said edge;

whereby said first and second members are released upon movement of said release sleeve from a rearward position to a forward position to urge said split locking ring up said shoulder and over said cylindrical surface when said leading edge and said split cylindrical wall engage said locking ring.

13. A coupling assembly for connecting two members comprising:

a split locking ring having a first end and a second end, said first and second ends being aligned to permit abutting engagement;

a first member extending along an axis from a forward end toward a rearward portion and having an exterior surface;

a rib extending outwardly from said exterior surface of said first member, said rib including a ramp tapering in a direction away from said forward end and away from said axis, said rib further including a cylindrical surface substantially parallel to said axis extending rearwardly from said ramp, said rib further including a shoulder tapering away from said forward end and inwardly toward said axis;

a second member having a leading end and a leading portion extending therefrom for receiving said first member, said leading portion having an inner surface;

a locking ring receiving groove defined by said inner surface of said second member;

a locking ring retaining groove defined by said inner surface of said second member, said retaining groove adjoining said receiving groove;

a release sleeve movably mounted adjacent said exterior surface of said first member for movement from a rearward position to a forward position, said sleeve having a leading edge facing toward said shoulder;

whereby upon insertion of said first member into said second member, said split locking ring travels up said ramp into said locking ring receiving groove, over said cylindrical surface and contracts to engage said shoulder and said locking ring retaining groove, said first and second members being released upon movement of said release sleeve from a rearward position to a forward position to engage said leading edge with said split locking ring to urge said locking ring up said shoulder and over said cylindrical surface.

14. The coupling assembly of claim 13, wherein said cylindrical surface of said rib extends rearwardly from said ramp a distance of at least 0.010 inch.

15. The coupling assembly of claim 13, wherein said cylindrical surface of said rib extends rearwardly from said ramp a distance of at least 0.030 inch.

16. The coupling assembly of claim 13, wherein said shoulder tapers at an angle in the range of from about 35° to about 55° relative to said axis.

17. The coupling assembly of claim 13, wherein said locking ring retaining groove substantially conforms to the size of said split locking ring.

18. The coupling assembly of claim 13, wherein said second member includes an annular recess extending outwardly from said inner surface and a resilient annular seal received in said annular recess, a portion of said annular seal extending inwardly of said inner surface and wherein said first member has a sealing portion between said forward end and said ramp, said sealing portion sized to sealingly engage said annular seal upon engagement of said first member in said second member.

19. The coupling assembly of claim 18, wherein at least one rigid annular ring is positioned in said annular recess axially between said annular seal and said locking ring receiving groove, a portion of said annular ring being inwardly of said inner surface.

* * * * *